Nov. 16, 1948. H. H. PLATT ET AL 2,453,857
AIRCRAFT MOORING DEVICE
Filed Nov. 14, 1941 2 Sheets-Sheet 1
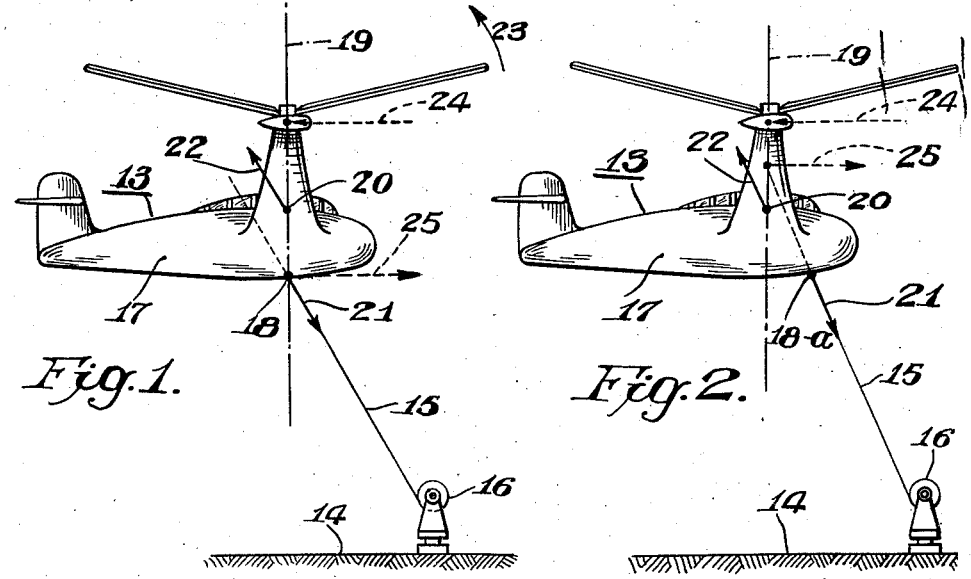
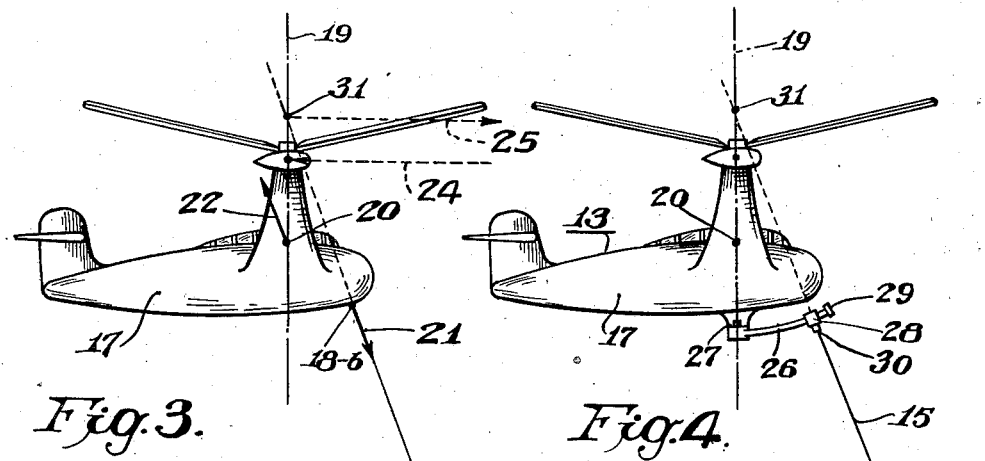
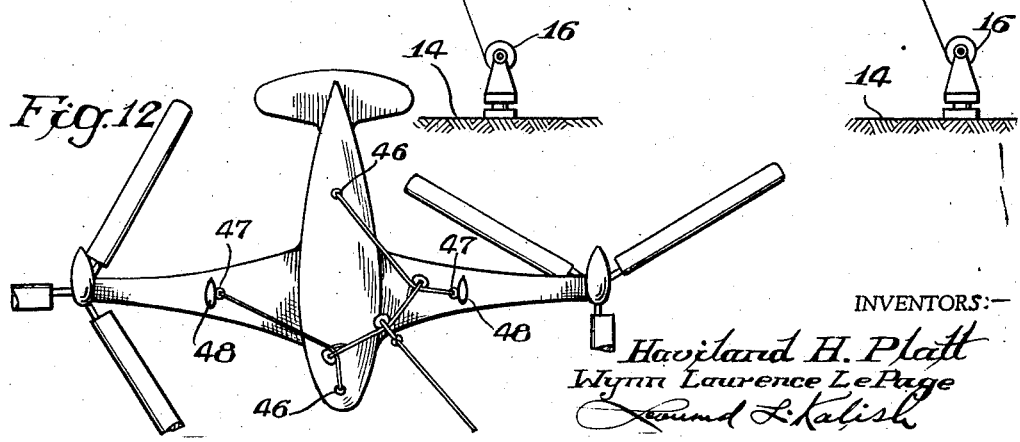
INVENTORS:—
Haviland H. Platt
Wynn Laurence LePage
Leonard L. Kalish Nov. 16, 1948.  H. H. PLATT ET AL  2,453,857
AIRCRAFT MOORING DEVICE
Filed Nov. 14, 1941  2 Sheets-Sheet 2
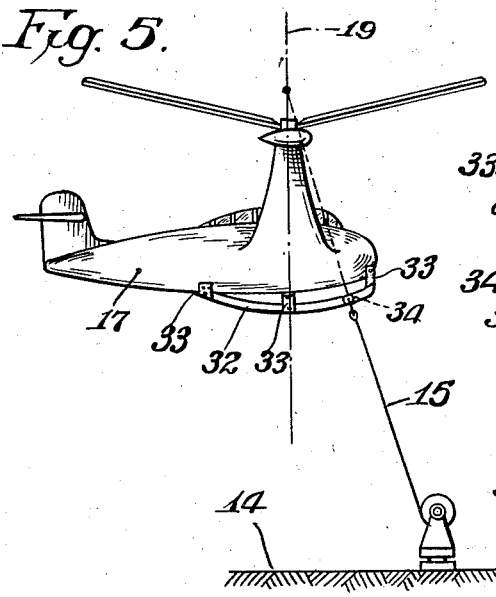
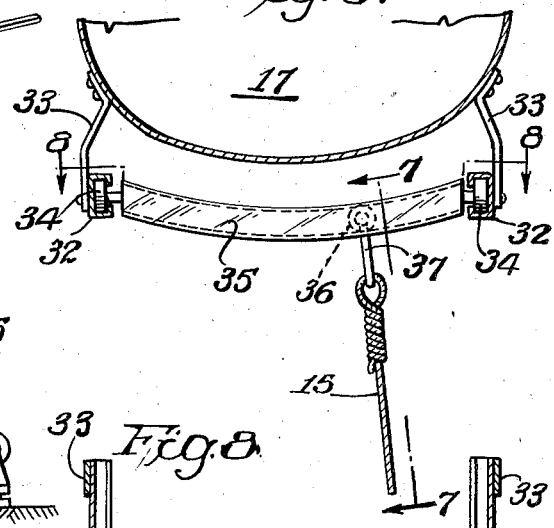
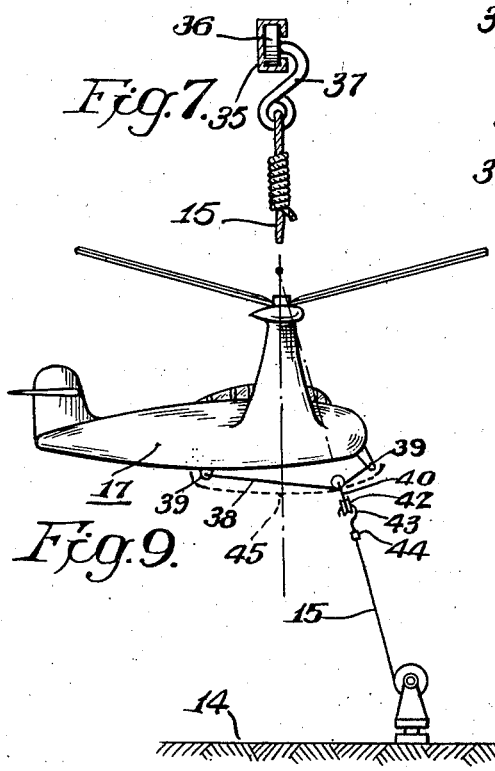
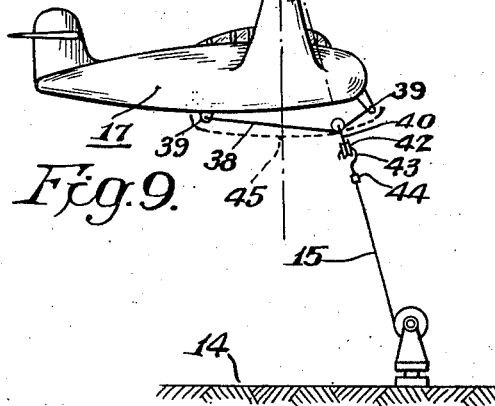
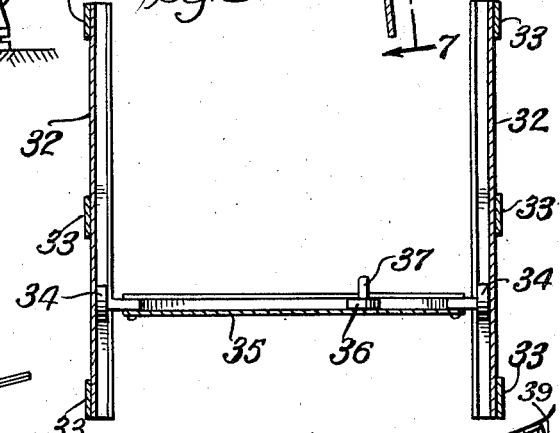
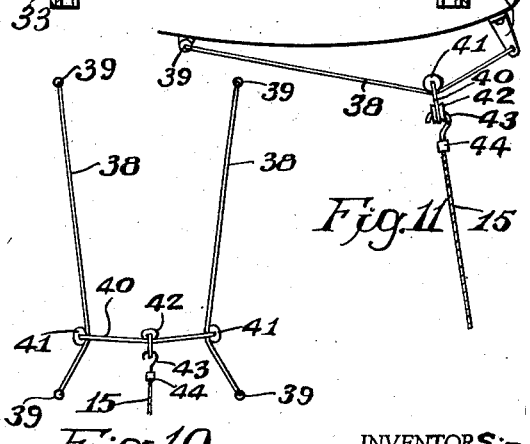
INVENTORS:-
Haviland H. Platt
Wynn Lawrence LePage
BY Leonard L. Kalish Patented Nov. 16, 1948

2,453,857

UNITED STATES PATENT OFFICE 2,453,857

AIRCRAFT MOORING DEVICE

Haviland H. Platt, New York, N. Y., and Wynn Laurence Le Page, Ardmore, Pa., assignors, by mesne assignments, to McDonnell Aircraft Corporation, St. Louis, Mo., a corporation of Maryland Application November 14, 1941, Serial No. 419,114

8 Claims. (Cl. 244—17)

The present invention relates to mooring or ground handling mechanisms for attaching to the ground, or any other relatively massive anchorage, helicopters and other aircraft capable of flight at low velocity relative to the anchorage.

The use of helicopters without controls has previously been proposed in place of captive balloons for artillery and other observation purposes, the intention being that the holding cable should co-operate with the aircraft to provide sufficient stability to prevent objectionable motion of the craft. It has however been found that, on account of the different arrangement of forces on the craft, a simple cable attachment is incapable of providing the necessary stabilization for a dynamic craft, as distinguished from the well known case of the captive balloon.

In the only hitherto known successful mooring mechanism for direct lift aircraft three cables are employed, each attached to a separate winch, the three winches being widely spaced on the ground at the apices of an equilateral triangle. While this device is entirely successful in providing a stable attachment for the craft, it is impractical for the following reasons: the three-winch installation requires a large, clear ground space; mobility of the machine is greatly impaired by the need for three separate vehicles; the necessary coordination among the three winches is difficult to realize in field operations.

Moreover, the operation of free helicopters, and similar craft, from restricted spaces under difficult conditions of weather is greatly aided by the use of suitable ground lines to be let down and caught by a ground crew in landing, or to be payed out and then released by the ground crew at take-off. Clearly such service is greatly hampered by the need for more than one line and for a wide base.

A great potential usefulness for helicopters and other slow flying aircraft is that of protecting vessels at sea, because of their ability to rise from and land on the small space available on the deck of a ship. Because of the smallness of the space, the proximity of masts and other obstructions, and the motion of the ship in the seaway, such operations are hazardous unless adequate guiding and holding means are available for maintaining the craft in the required position relative to the landing deck. A single rope or cable which can be let down from or drawn up into the aircraft and which can be hauled in or paid out by members of the ship's crew, either manually or by attachment to a winch, provides the ideal handling means for this purpose, if it can be provided without causing serious instability of the craft.

One object of the present invention is to provide attachment means, or fittings, for attaching a mooring line to an aircraft such that any pull on the line acts to cause a change in attitude of the craft which will tend to move it toward a central position over the ground attachment point of the line, thus insuring stability for the aircraft while it is being hauled down or released and also giving it positive guidance down to or up from the established landing position.

Another object is to secure stability and correct positioning of the aircraft with a single handling line so that a maximum of simplicity and mobility is achieved.

With the above and other objects in view, as will appear more fully from the following detailed description, appended claims and accompanying drawings, the invention includes various novel modifications of sliding or shifting attachment means whereby the point of attachment of a cable or rope may change position in response to the angularity of the tension on the rope in such a way that the line of thrust is maintained at all times at a desired relationship with respect to the center of gravity, center of air resistance, or other established reference point in the aircraft to which the line is attached.

For the purpose of illustrating our invention, we have shown in the accompanying drawings forms thereof which are at present preferred by us, although it is understood that the various instrumentalities of which our invention consists can be variously arranged and organized and that our invention is not limited to the precise arrangements herein shown and described.

Referring to the drawings in which like reference characters indicate like parts:

Figure 1 represents a diagrammatic side elevational view of a helicopter, with a diagram of the forces acting upon it when it is attached to a mooring cable at a fixed point on the lower part of its fuselage.

Figure 2 represents a view similar to Figure 1, illustrating the change in the force diagram with a hypothetical change in the position of the cable attachment point.

Figure 3 represents a view similar to Figures 1 and 2, illustrating the effect on the force diagram when the attachment point is shifted to a second hypothetical position.

Figure 4 represents a diagrammatic side elevational view of a helicopter equipped with a mooring cable attachment device, in accordance with one form of our invention, which employs a swiveling slide-bar.

Figure 5 represents a diagrammatic side elevational view of a helicopter, equipped with another embodiment of our present invention, employing guides and rollers.

Figure 6 represents a cross-sectional view, generally transverse of the fuselage of the helicopter, showing the universal attachment fitting illustrated in Figure 5.

Figure 7 represents a cross-sectional view generally along the line 7—7 of Figure 6, illustrating a detail of the construction shown in Figure 6.

Figure 8 represents a cross-sectional view generally along the line 8—8 of Figure 6.

Figure 9 represents a diagrammatic side elevational view of a helicopter equipped with still another form of our invention, employing cable harness and travelers.

Figure 10 represents a plan view of the cable harness attachment device illustrated in Figure 9.

Figure 11 represents a side elevational view of the device illustrated in Figure 10, and Figure 12 represents a bottom plan view of a helicopter fitted with a device similar to that of Figures 9, 10 and 11 but with the points of attachment to the aircraft shifted through an angle of 45°.

In the accompanying drawings, the numeral 13 generally denotes an aircraft capable of hovering, substanitally motionless relative to the ground, or other relatively massive anchorage 14. In general the mooring, or handling cable, rope or other line 15 is in operation attached at one end to the aircraft 13 and at the other to the winch 16, or other means of exerting or withstanding tension on the line 15.

For purposes of illustration, the aircraft 13 shown is a twin rotor helicopter from which, except in Figure 12, the landing gear has been omitted in the interest of clarity.

In Figure 1 the line 15 is shown attached fixedly to the helicopter fuselage 17 at the point 18 in the vertical line 19 passing through the center of gravity 20 of the aircraft 13. When the aircraft 13 as shown is angularly displaced from a position vertically above the winch 16 and a tension is applied suddenly in line 15, as represented by the vector 21, the inertia of the aircraft gives rise to a reactive force opposite in direction to 21 and acting on the center of gravity 20, as indicated by the vector 22. Since the force vectors 21 and 22 are not in line they give rise to a force couple tending to rotate the aircraft in the direction of the arrow 23. Since in helicopters and similar craft the thrust force remains generally in line with the axis of rotation of the rotors, rotation of the craft in the direction 23 carries the thrust force with it and so tends to move the aircraft away from the winch 16 instead of toward it. Similarly, if we assume the forces present to be steady and therefore not involving the initial reaction of the mass of the craft, such as a condition wherein a steady wind is exerting a pressure to hold the aircraft to one side of the winch location, a couple is again produced tending to overturn the craft away from the winch 16 and so to move it in the direction opposite to that desired. Thus the dotted vector 24 may represent the wind force, acting at a point close to the rotor, as is necessarily the case because the rotor resistance to a wind is in such craft unavoidably much greater than that of the fuselage and other components. The horizontal component of the hold down line tension may be indicated by the dotted vector 25 which forms with vector 24 the above noted overturning couple in the direction 23. Thus it is seen that the attachment arrangement of Figure 1 results in overturning and pulling away of the aircraft whether the force on the line is suddenly or steadily applied.

Figure 2 is generally the same as Figure 1 except for the location of the attachment point 18—a, which is now placed so that the line of 15 extended passes above the center of gravity 20. The vectors 21 and 22 resulting from a sudden pull on the rope 15 are now so related as to cause tilting of the aircraft and motion thereof toward the winch 16 instead of away from it as before. With respect to a steady pull against a wind, however, the couple resulting from the vectors 23 and 25, while less in extent, is still adverse.

Figure 3 illustrates still further forward shift of the attachment point 18—b so that the line of tension of 15 passes above the center of lateral air pressure as well as above the center of gravity. The direction of the tilting couple is now in the stabilizing direction for both sudden and steady pulls. If now the attachment mechanism can be so arranged that the extended line of the hold down rope 15 intersects the axis of the rotor at or above the center of lateral air resistance, regardless of the position of the aircraft with relation to the ground attachment point 16, a pull on the line will tend always to bring the craft into a position vertically above the ground attachment. In other words, such a mechanism is completely stabilizing.

One form of attachment mechanism embodying the above stabilizing principle is illustrated in Figure 4. An arcuate guide bar 26 is mounted at one end on a suitable bearing 27 secured to the bottom of the fuselage 17, said bearing having its axis of rotation substantially in the rotor axis 19. The guide bar 26 is bent in the arc of a circle having its center in the rotor axis 19 at a point 31 which is above the center of gravity of the machine and preferably above the center of lateral air resistance as well. As the guide bar 26 rotates on its bearing 27, then, it sweeps out a portion of the surface of a sphere whose center is at the point 31.

Slidably fitted on the guide bar 26 is the slide 28 adapted to slide freely along it. A flange 29 is provided on the end of guide bar 26 to keep slide 28 from slipping off the end.

The hold down cable 15 is attached to slide 28 through a suitable swivel 30. It can readily be seen that so long as a tension is maintained in cable 15, slide 28 will remain in such a position that the line of cable 15 adjacent to slide 28 will be normal to guide bar 26 and therefore will remain always in line with the radius of the arc formed by 26. Similarly, guide bar 26, under the influence of a side pull from the cable will turn in bearing 27 until it lies in the plane containing cable 15 and rotor axis 19. Thus, within the angular limit established by the length of the guide bar 26, the extension of cable 15 must pass always through the point 31 regardless of the direction or amount of displacement of the aircraft from the position vertically over 16, the bar 26 turning in the bearing 27 and the slide 28 moving along guide bar 26 the amounts necessary to establish the alignment.

Figures 5, 6, 7 and 8 illustrate a second embodiment of our invention employing curved tracks. Two arcuate tracks 32, of box section, are secured to the bottom of fuselage by means of suitable attachment plates 33 in such position that they are parallel to each other and that their center lines, when viewed in side elevation, appear as arcs of circles described about point 31 in the rotor axis 19 above the center of gravity and preferably above the center of lateral air resistance also. In tracks 32 two rollers 34 are adapted to roll freely. Supported by rollers 34 is the transverse track member 35 of similar construction to tracks 32. Track 35 is formed with arcuate center line so that when viewed in front elevation it forms an arc of a circle described about point 31. Adapted to travel freely in track 35 is roller 36 to which is attached the hook 37 formed with an eye through which the cable 15 is spliced. Suitable stops, not shown, are provided to prevent any of the rollers from leaving the ends of their respective tracks. A lateral component of pull on cable 15 will cause the rollers to run in their tracks until the line of the upper end of cable 15, extended passes through point 31. Thus the stabilizing effect is identical with that of the embodiment having the arcuate guide rod.

Figures 9, 10, 11 and 12 illustrate diagrammatically still another embodiment of our invention employing cable or rope bridles and travelers, Figure 12 showing a slightly different arrangement from that of Figures 9, 10 and 11.

In the arrangement of Figures 9, 10 and 11, two bridle cables 38 are secured at their ends to the fuselage 17 at the four attachment fittings 39 disposed generally symmetrically fore and aft and laterally of the rotor axis 19, a suitable amount of slack being allowed in each cable 38. A third cable 40 is attached at each end to one of the traveler pulleys 41 which are so formed on their peripheries as to run as rollers on the cables 38. Cable 40 is also fitted with a suitable amount of slack. Adapted to be retained by and to run as a roller on cable 40 is the third pulley 42 to which is secured the hold down line 15 through the hook 43 and the swivel 44.

In operation, the pulleys 41 roll along the cables 38 in response to fore and aft displacements of the aircraft relative to the anchorage 16. When tension is maintained on cable 15 the path along which each pulley moves, shown dotted at 45 in Figure 9, is a flat curve readily identifiable as an elliptic arc the central main portion of which closely approximates the arc of a large circle. By providing the correct amount of slack in cables 38 the approximate center of the said circular arc may be placed at any desired point along axis 19. For stabilization purposes the slack is adjusted so as to place the metacenter of cable thrust above the center of gravity of the aircraft and preferably at or above the aerodynamic drag center as well. By suitable adjustment of the cross cable 40 a similar relationship may also be established relative to lateral displacements of the aircraft. Thus it is seen that bridle and traveler arrangement effectively approximates the functions of the swiveling guide arm and fixed track arrangements previously described.

Figure 12 shows an arrangement similar to that of Figures 9, 10 and 11 but with the orientation of its attachment points relative to the fuselage axis shifted through 45°, two attachment fittings 46 of the cables 38 being secured to the fuselage 17 in its vertical median plane while the other two attachments 47 are secured to the landing gear struts 48, thus permitting long cables to be employed with less structural difficulty in their attachement. Longitudinal displacements of the aircraft involve with this arrangement rolling of the pulley 42 on cable 40 as well as rolling of pulleys 41 on cables 38. The overall operative response is, however, generally the same as that of the embodiment shown in Figures 9, 10 and 11.

While we prefer to form the guide bar 26 of Figure 4 and the tracks 32 of Figures 5 and 6 with a spherical or circular curvature, our invention contemplates other curvatures as well. Thus, for example, the guide bar or the tracks could be formed with a parabolic curvature so that the point of attachment of the cable with the aircraft would move along the surface of a paraboloid (as distinguished from the spheroidal movement of the point of attachment of the cable 15 shown in Figures 4 to 6). If the guide bar or the tracks are given a parabolic curvature, the curvature should be such that the origin of the curve lies above the center of gravity of the aircraft and preferably above the center of horizontal aerodynamic wind resistance or wind resistance as well. In this way, the cable which would be normal or perpendicular to the curve at its point of attachment, would exert its pull along a line intersecting the vertical line running through the center of gravity above the center of gravity and preferably above the center of wind resistance as well. Moreover, the normal to the parabola would intersect the vertical center of gravity line at higher points, the further the aircraft were from the position vertically above the ground attachment point 16. In this way, the aircraft would be tilted more in the direction of the ground attachment point the further it were from the position vertically over it so that the aircraft would have a greater tendency to approach the vertical line. The guide bar or tracks might be given other curvatures, the only requirement being that lines normal to the curved surface would intersect the vertical center of gravity line above the center of gravity of the aircraft and preferably above the center of wind resistance as well.

Thus, the expression "arcuate" as used in the following claims is employed in its broad sense, as defined, for example, in Funk & Wagnall's New Standard Dictionary, of having the shape of a curve, rather than the narrow sense of having a circular curvature.

While we have shown the various phases and features of our invention in certain specific embodiments or combinations, we are aware that our invention and the several phases or features thereof may be embodied in other forms without departing from the spirit or essential attributes thereof, and we therefore desire the present embodiments to be considered in all respects as illustrative and not restrictive, reference being had to the appended claims rather than to the foregoing description, to indicate the scope of the invention.

The invention having been hereinabove described, what is hereby claimed as new and desired to be protected by Letters Patent is:

1. A mooring device for an aircraft including a pair of parallel arcuate tracks secured to the lower part of said aircraft, a generally transverse carriage adapted to run in said track and having a transverse track formed thereon, and mooring line attachment means mounted upon said transverse track and freely moveable therealong.

2. A mooring device for an aircraft including a pair of bridle cables secured to the lower part of said aircraft, a transverse bridle cable whose ends are adapted for free movement along the first-named cables, and mooring line attachment means freely moveable along said transverse bridle cable.

3. A helicopter including a power-actuated lifting rotor, a mooring line for said helicopter, a support carried by said helicopter, and an attachment fitting for said mooring line; said attachment fitting being so mounted on said support that it is free to move universally within a spheroidal surface having its center of curvature approximately at the center of horizontal aerodynamic resistance of said helicopter and above the rotor.

4. A helicopter including a power-actuated lifting rotor, a mooring line for said helicoper, a support carried by said helicopter, and an attachment fitting for said mooring line, said attachment fitting being so mounted on said support that it is free to move universally within a spheroidal surface having its center of curvature above the center of horizontal aerodynamic resistance of said helicopter.

5. A helicopter including a power-actuated lifting rotor, a mooring line for said helicopter, a support carried by said helicopter, and an attachment fitting for said mooring line; said attachment fitting being so mounted on said support that it is free to move universally within a spheroidal surface having its center of curvature directly above the center of gravity of said helicopter; the position of said fitting relative to said helicopter being determined by the angle of thrust thereupon.

6. A helicopter including supporting rotors, a mooring line for said helicopter, a support carried by said helicopter, and an attachment fitting for said mooring line; said attachment fitting being so mounted upon said support that it is free to move universally within a generally spheroidal surface having its center of curvature approximately at the composite axis of said supporting rotors.

7. A helicopter including supporting rotors, a mooring line for said helicopter, a support carried by said helicopter, and an attachment fitting for said mooring line; said attachment fitting being so mounted upon said support that it is free to move universally within a generally spheroidal surface having its center of curvature above the composite axis of said supporting rotors.

8. A helicopter including a power-actuated lifting rotor, a mooring line for said helicopter, a support carried by said helicopter, and an attachment fitting for said mooring line; said attachment fitting being so mounted on said support that it is free to move universally within a curved surface such that lines normal thereto pass through a point directly above the center of gravity of said helicopter.

HAVILAND H. PLATT.
WYNN LAURENCE LE PAGE.

REFERENCES CITED

The following references are of record in the file of this patent:

UNITED STATES PATENTS

| Number | Name | Date |
|---|---|---|
| 2,156,334 | Bothezat | May 2, 1939 |
| 2,181,477 | Chupp | Nov. 28, 1939 |
| 2,429,502 | Young | Oct. 21, 1947 |

FOREIGN PATENTS

| Number | Country | Date |
|---|---|---|
| 798,180 | France | May 11, 1936 |
| 815,811 | France | July 23, 1937 |